United States Patent
Kraemer

(10) Patent No.: US 7,297,303 B2
(45) Date of Patent: Nov. 20, 2007

(54) PROCESS OF INJECTION MOLDING COMPOSITE ARTICLES AND TOOTHBRUSH OBTAINABLE THEREBY

(75) Inventor: Hans Kraemer, Buehl (DE)

(73) Assignee: GlaxoSmithKline Consumer Healthcare GmbH & Co KG, Buehl (DE)

( * ) Notice: Subject to any disclaimer, the term of this patent is extended or adjusted under 35 U.S.C. 154(b) by 567 days.

(21) Appl. No.: 10/311,451

(22) PCT Filed: Jun. 12, 2001

(86) PCT No.: PCT/EP01/06637

§ 371 (c)(1),
(2), (4) Date: Jun. 2, 2003

(87) PCT Pub. No.: WO01/96088

PCT Pub. Date: Dec. 20, 2001

(65) Prior Publication Data

US 2004/0010876 A1     Jan. 22, 2004

(30) Foreign Application Priority Data

Jun. 15, 2000     (GB)     ................................. 0014495.6

(51) Int. Cl.
*B29C 45/16*     (2006.01)
*B29D 31/00*     (2006.01)

(52) U.S. Cl. .................. 264/243; 300/21; 15/143.1; 15/167.1

(58) Field of Classification Search ............... 15/143.1, 15/167.1; 300/21; 264/243
See application file for complete search history.

(56) References Cited

U.S. PATENT DOCUMENTS

| | | |
|---|---|---|
| 5,898,967 A | 5/1999 | Wu et al. |
| 2004/0012117 A1* | 1/2004 | Mueller ..................... 264/243 |

FOREIGN PATENT DOCUMENTS

| | | |
|---|---|---|
| JP | A 09011260 | 9/1997 |
| WO | A 0742090 | 4/1996 |
| WO | WO A 9610934 | 4/1996 |
| WO | WO A 9835809 | 8/1998 |

\* cited by examiner

*Primary Examiner*—Randall Chin
(74) *Attorney, Agent, or Firm*—Nora Stein-Fernandez; Theodore R Furman; Charles M Kinzig

(57) ABSTRACT

An injection moulding process for making a moulded article particularly a toothbrush consisting partly of a hard first plastics material by providing a first injection mould introducing a component into the cavity adjacent to the surface; injecting a plastics material into the cavity so that the plastic material is fixed to the component and the component forms part of the outer surface of the article. In a second moulding operation another material such as an elastomer may be injected. A toothbrush product made by this process is also described.

8 Claims, 4 Drawing Sheets

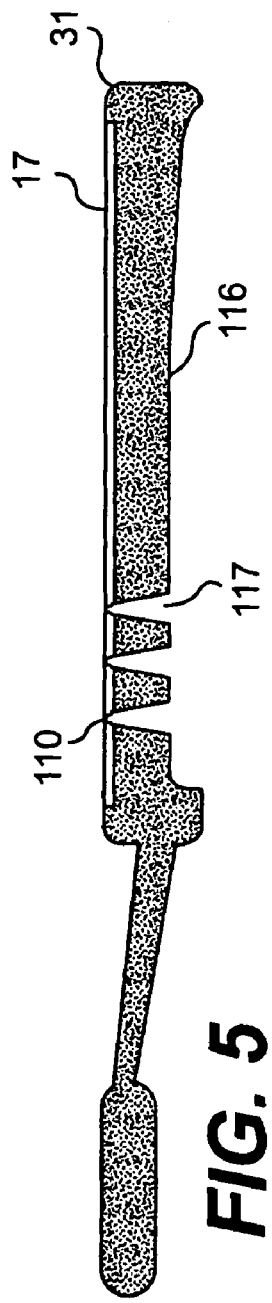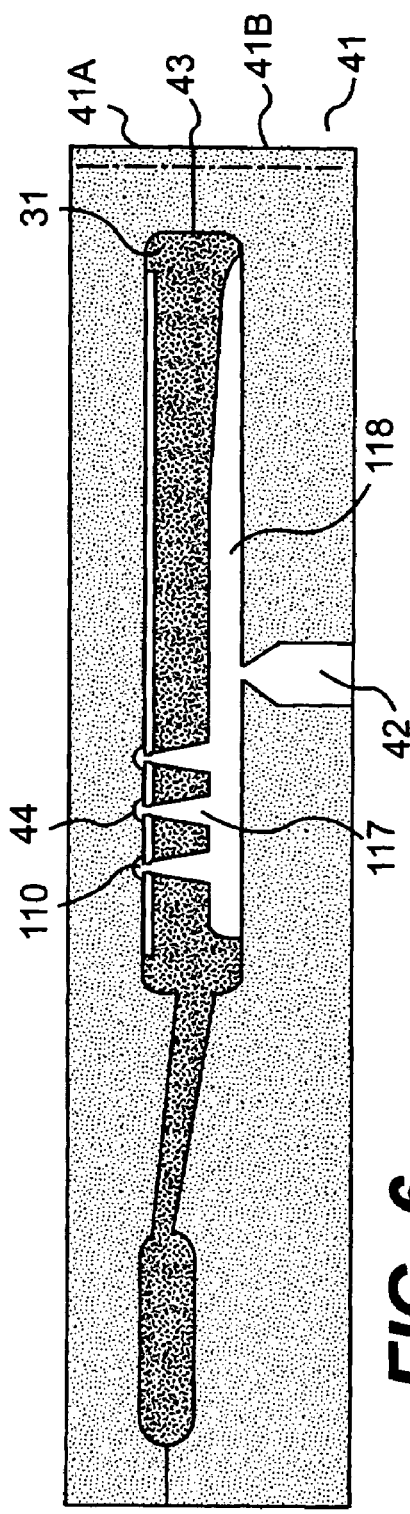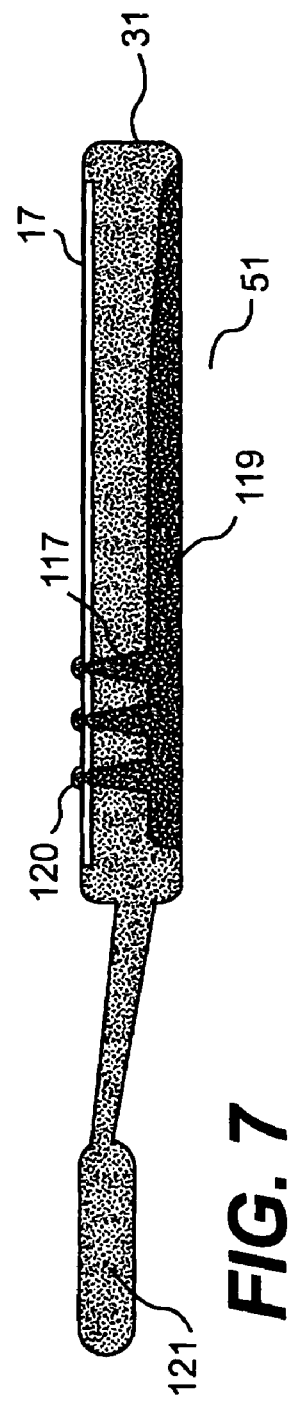

PROCESS OF INJECTION MOLDING COMPOSITE ARTICLES AND TOOTHBRUSH OBTAINABLE THEREBY

FIELD OF THE INVENTION

This invention relates to a process for making moulded articles, particularly toothbrushes, and to a product moulded article made using this process, particularly a toothbrush.

BACKGROUND OF THE INVENTION

Toothbrushes are well known articles and are generally made of hard plastics materials such as polypropylene, polyamide or styro acryl nitrol ("SAN"), almost invariably by means of an injection moulding process. Two component toothbrushes are also known which comprise parts made of a first material being a hard plastic for example of the type mentioned above, and parts made of a second material different to the hard plastic for example an elastomer (rubbery) material. Suitable thermoplastic elastomers suitable for such two component toothbrushes are well known and are now extensively used. See for example EP-A-0 336 641 and DE-A-39 23 495 for examples of such toothbrushes. Generally such two-material toothbrushes are made in a two stage injection moulding process in which firstly a "skeleton" comprising the first material part(s) is made, and this skeleton is then enclosed in a second injection mould into which the second material is injected. Such a process is well known, and disclosed for example in WO-A-94/05183.

It is also known in the brush industry, e.g. from EP-A-0 742 090 to embed an insert in a brush handle by positioning the insert in the cavity of an injection mould, first covering one side with a injected plastic material, and then in a subsequent injection moulding operation covering the other side with the plastic material. U.S. Pat. No. 2,923,035 discloses a method for making plastic articles, particularly brushes, in which a first piece is first made by injection moulding a first plastic material in a first mould, a second piece of an opaque material is put on top of the first piece, then the assembly of first and second pieces is positioned in a second mould and encased in a second mould, and then encased in a second plastic material.

It is an objection of the present invention to provide a further process for making toothbrushes, and to provide toothbrushes of enhanced appearance, quality and resistance to wear etc., by the use of a third component. Other objects of the invention will become apparent from the following description.

SUMMARY OF THE INVENTION

According to this invention process for making a moulded article consisting partly of a hard first plastics material comprises:

providing a first injection mould having a cavity which defines at least part of the shape of the article and having a cavity surface bounding the cavity;

introducing a component into the cavity adjacent to the cavity surface;

injecting a first fluid plastics material into the first mould cavity, under conditions such that the plastics material flows into contact with the component and when the plastics material solidifies the hardened plastic material is fixed to the component and the component forms at least part of the outer surface of the article.

The plastics material may then be allowed to solidify sufficiently that the so formed article can be removed from the mould cavity.

The moulded article formed in this process is suitably a part or whole toothbrush comprising a grip handle part and a head part into which bristles may be fixed, either using conventional metal fixing staples, or by moulding the bristle tufts directly into the head using any of known "anchorless" processes.

Suitably the component may comprise a part of the grip handle. The component may for example comprise a decorative and/or a structural part. For example the component may be made of a material in thin e.g. sheet form, e.g. 0.01-2.0 mm, preferably 0.1-1.0 mm thick, metal such as aluminium or an aluminium alloy, a second plastic (suitably a different plastic to the first plastics material) or a metal-plastic laminate or composite e.g. a metal filled plastic. "Sheet" as used herein will be understood in the art but for clarity includes primarily shapes which have a thickness dimension of 0.2 or less, preferably 0.1 or less, more preferably 0.05 or less of both their length and width dimension. If the component comprises a plastic material this should have a softening point higher than that of the first plastics material or the operating temperature of the injection mould, whichever is higher, to preserve the structural integrity of the component.

For example the component may comprise in form a thin shell, a surface of which forms at least part of the outer shell, a surface of the finished article e.g. of a toothbrush, e.g. part of the outer surface of the grip handle part of the toothbrush. Such a component may therefore have a convex outer surface generally conforming to the outer surface profile of the article to be formed, and a concave inner profile being generally a negative of the outer surface profile. For example the component may comprise a thin shell of a decorative foil. The component may comprise a decorative component e.g. a shiny or coloured outer surface part, and/or it may help to protect the plastic part of the article from wear, and/or it may provide the outer surface of the grip handle with improved grip characteristics such as surface texture. Preferably the component is made robust enough, e.g. being made thick enough, either locally or generally, or may be provided with reinforcements e.g. ribs etc. on its inner surface to resist the forces of the injection of the first plastic material.

The injection mould may for example be a multi-part e.g. two part mould where each part defines part of the mould cavity and together the parts define between them the entire mould cavity when the parts close together. Multi-part moulds of this type for toothbrush manufacture are well known.

Suitably the component is positioned in the mould cavity in contact with the inner surface of the cavity surface so that at least part of the component forms part of the outer surface of the article. It may be advantageous to include features in the mould, e.g. supports or internal cores to hold the component in position in the mould cavity during the first moulding operation.

Suitable methods of supporting the component in the mould cavity will be apparent to those skilled in the art.

The mould and component may have co-operating parts, e.g. respective parts of a multi-part mould may grip the component between them when they close together.

Preferably the component is held in place in the cavity in contact with the cavity surface, at least immediately prior to and preferably during the injection of first material, by the application of reduced atmospheric pressure to the component via a conduit in the mould and opening at openings into the mould cavity, i.e. sucking the component against the cavity surface. If reduced atmospheric pressure is used in this way preferably the component seals against the mould cavity surface to maintain the vacuum and to prevent injected first plastic material from leaving the mould cavity via the conduit. Suitable dimensions of conduits and openings and suitable pressures to achieve the above will be apparent to those skilled in the art. It is important to ensure that the dimensions of any such opening into the mould cavity is not so large that if the component is a thin and relatively fragile foil then the pressure within the mould cavity when the first plastic material is injected into the mould causes the foil to be punctured at the opening (s). For example rather than one or a few large opening(s) it may be preferable to use many small pin-point openings distributed over the inner surface of the mould cavity where the component comes into contact with the inner surface. These many openings may communicate with a single vacuum manifold.

Suitably the component is positioned in the mould cavity by automatic machinery, such as a robot, for example repeatedly taking components from a storage source or conveyor and inserting them precisely into the mould cavity for the above-described process to be performed.

The first plastics material may be any plastics material known to be suitable for making the hard plastics parts (e.g. the structure of the head, grip handle, neck etc.) of a toothbrush, for example a polypropylene, polyamide or styro lacryl nitrol ("SAN"). A typical suitable polypropylene is for example Polypropylene Mosten 52945 (Marketed by Schulman). Typically such material have a Shore A hardness of 90-100. Suitable moulding conditions for injecting such plastic materials into an injection mould are known from the art.

Suitable conditions are also known for ensuing that the component, e.g. in the form of the above-described thin sheet, or shell, or metal or comprising a plastics material, fixes securely to the mass of hardened first plastics material. For example the inner surfaces of the component which come into contact with the first plastic material may be provided with barbs or anchor parts which become embedded in the first plastics material. Additionally or alternatively adhesion can occur between the component and the first plastics material, and the surface(s) of the component which comes into contact with the first plastic may be appropriately roughened or treated with a bonding aid etc if necessary to enhance adhesion. Additionally or alternatively the component may have cavities in it into which the plastics material can flow to form engagement parts to retain the component in place. Generally adhesion between the first material and surface of the component may be adequate to achieve a bond between the first material and the component.

Optionally and preferably the so-formed article, i.e. comprising the first material and the component, may be further processed in a second injection moulding operation by:

providing a second injection mould part having a second mould cavity therein;

introducing the so-formed article into the second mould cavity of the second injection mould part;

injecting a melted fluid second material into the mould and into contact with the so-formed article;

allowing the melted fluid second material to solidify sufficiently and such that when the second material solidifies the hardened second material is fixed to the article.

The so formed article may then be removed from the second mould cavity.

The second injection mould may for example again be a multi-part e.g. two part mould where each part defines part of the mould cavity and together they form the entire mould cavity. Generally the second injection mould will comprise separate parts to the first injection mould, but one or more parts of the first injection mould may form one or more parts of the second injection mould.

The second material may for example be a plastics material which is suitable for forming hard plastic parts of the article or it may preferably be for example a rubbery material such as a thermoplastic elastomer. For example such a rubbery material may comprise a grip pad of generally known type on the grip handle of an article being a toothbrush. The term "rubbery" as used herein is not limited to rubber itself, either natural or synthetic but includes all materials such as elastomers (also equivalently known as elastomeric materials) having elastic properties under compression or stretching similar to rubber itself. Suitable rubbery materials are for example thermoplastic elastomers of the type well known in the toothbrush industry for forming toothbrush grip pads, as for example as sold by the applicant and its related companies under the trade marks "AQUAFRESH" and "Dr BEST". Suitable rubbery materials include those sold under the trade mark SANTOPRENE, and typically have a Shore A hardness from about 10 to 90, preferably 30 to 80 Shore A. Suitable injection moulding conditions for such materials to achieve adhesion between the hard plastic materials of which toothbrushes are made are known in the art and have been used in the manufacture of two-component toothbrushes for several years.

Suitably one or more hollow in the surface of the article, or one or more aperture passing through the article may be formed in the first moulding operation, which are suitable to receive and to be wholly or partially filled with, the second material in the second moulding step. Such hollow and aperture may be formed in the stage of injection of the plastic material during the first moulding operation by the provision of one or more corresponding convex projection from the cavity surface of the first injection mould, to thereby leave a hollow or aperture generally in the shape of a "negative" of the convex projection. Such convex projection, often known in the injection moulding art as an internal core, may for example extend in a direction across the mould cavity from one of the parts of the mould toward another.

The second material may flow into the hollow and/or through the aperture and flow to parts of the article distanced from the injection gate of the second material. Such hollow or aperture may thereby comprise a moulding channel, generally known in principle, by means of which the third material may be transmitted from the injection gate to distant parts of the article, such as a toothbrush. By means of such a channel the second material may be caused to flow into contact with the component. Adhesion between the component and the second material may also then take place.

Additionally the component may have one or more hole, preferably a pattern of a plurality of holes, therein, which are in communication with an aperture when the article is in the second mould, so that the second material can flow via the aperture and into and optionally through the hole to thereby form a part of the third material exposed on the outer surface of the article adjacent to the hole on the outer surface of the component. In the second mould there may be a cavity adjacent such hole so that this exposed second material forms a convex bulge on the surface of the component.

The so-formed articles may be removed from respectively the first or the second mould cavity by conventional means, e.g. conventional ejector pins etc., and may thereafter be handled in further processing operations by suitable machinery, for example automatic handling machinery. Otherwise the first and second moulds may be generally conventional.

The invention also provides a moulded article, particularly a toothbrush, being obtainable by such a process.

Such an article may comprise for example a toothbrush made generally of a hard plastics first material, having at least part of its outer surface provided by a component being a thin sheet or shell of a material affixed to the plastics material. This sheet or shell may for example comprise part of the outer surface of the toothbrush grip handle, for example a decorative and/or reinforcing, and/or grip enhancing thin metal sheet or shell. Such a sheet or shell may for example be comprised of the materials discussed above, and the sheet or shell may be fixed to the plastics material in the ways described, e.g. by adhesion or anchoring. Such a toothbrush may also have a part, especially a grip pad, made of a second material being a rubbery material such as a thermoplastic elastomer. A part of this second material may advantageously pass through the shell from behind the shell and be exposed upon the outer surface of the shell, particularly as a convex bulge, a plurality of which may be arranged in a regular pattern of grip enhancing bulges. Such bulge may for example be generally hemispherical or generally conical, of diameter ca. 0.75-2.0 mm and projecting ca. 0.3-1.0 mm above the outer surface of the shell. Typically such a pattern of bulges may be arranged in a regular pattern with their centres ca. 0.3-1.0 cm, typically ca. 0.4-0.5 cm apart for optimal grip.

The invention provides an injection mould suitable for such a process as described above and suitable for making such a product as described above, particularly a toothbrush.

BRIEF DESCRIPTION OF THE DRAWINGS

FIG. 5 shows a longitudinal section through the product made in the mould of FIGS. 1 to 5.

FIG. 6 shows a sectional view through the product as formed in the mould of FIGS. 1 to 5 enclosed in a second injection mould.

FIG. 7 shows a longitudinal section through a completed toothbrush as formed in the mould of FIG. 6.

Referring to FIGS. 1 to 5, an injection mould 11 overall comprises two mould parts 11A, 11B, each of which define between them part of a mould cavity 12. The two parts 11A, 11B part along split line 13. The cavity 12 defines the shape of the skeleton of a toothbrush having a grip handle to be formed in part 14 of cavity 12 and a head to be formed in part 15 of cavity 12, with an intermediate neck region to be formed in part 16 of cavity 12. The head is formed with holes into which bristles may be inserted, by means of pins extending into the part 15 of cavity 12 but for simplicity these are not shown.

Figure 1:
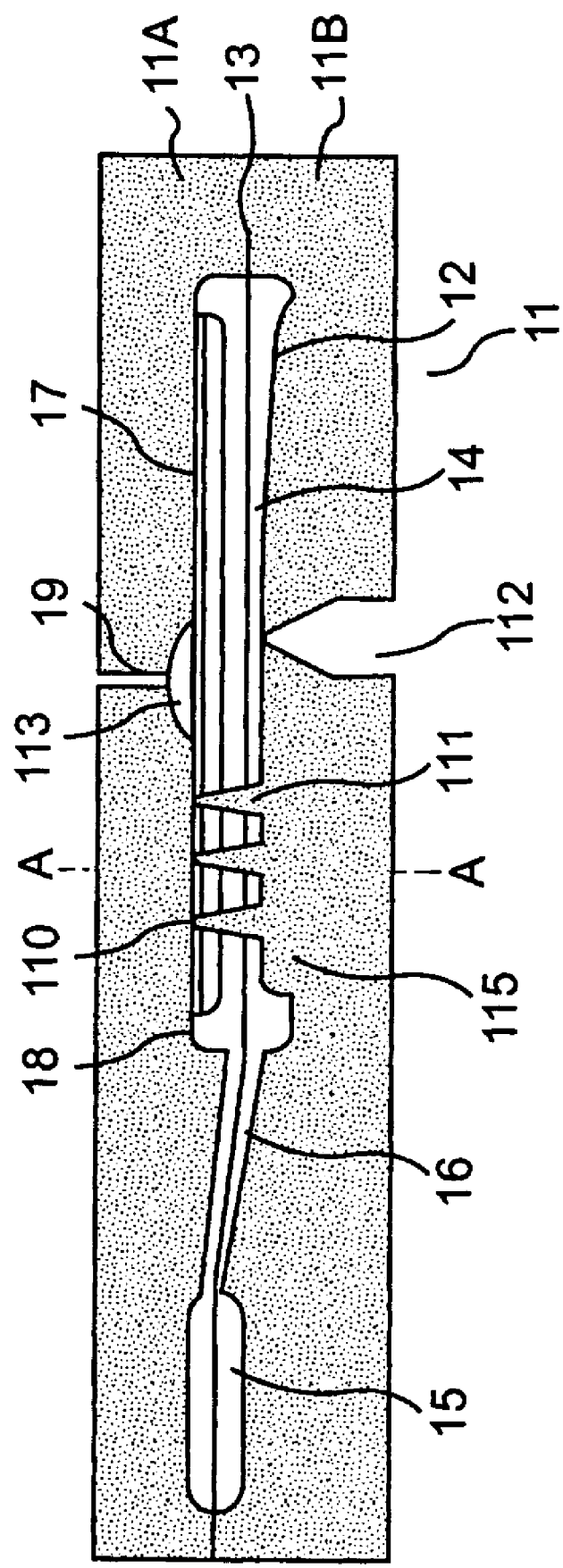
FIG. 1 shows longitudinal sectional view through a two-part injection mould for a toothbrush.

Into the cavity 12 has been introduced a component 17, which is positioned adjacent to and in contact with the inner surface 18 of the cavity 12. The component 17 is a thin shell, made of a decorative metal foil. Over a large part of its extent the shape of the outer surface of the component 17 is convex and corresponds closely to the shape of the inner surface of the cavity 18. Although it is thin, the shell 17 is rigid enough for manipulation and to resist the forces resulting from injection of the plastic material.

Figure 2:
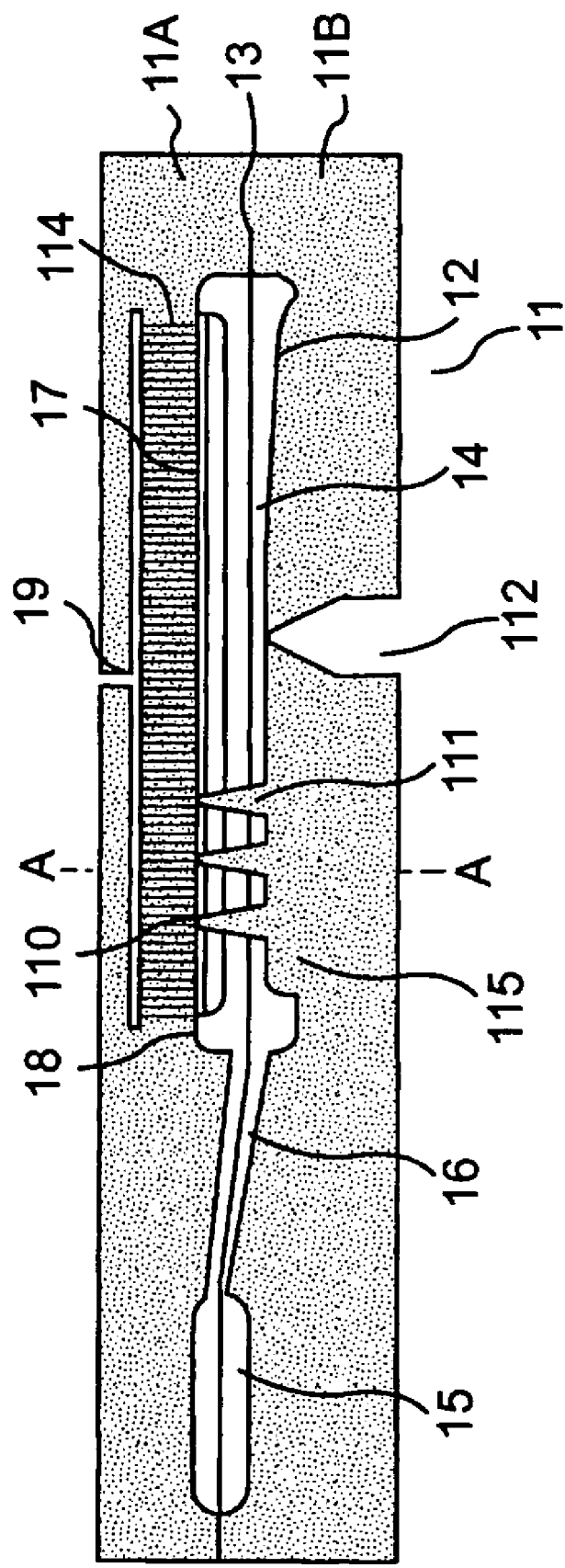
FIG. 2 shows another longitudinal sectional view through a two-part injection mould for a toothbrush.
Figure 3:
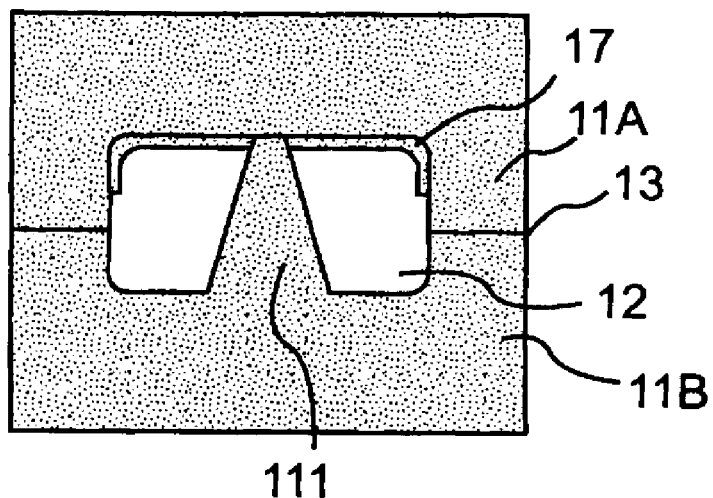
FIG. 3 shows a cross section through the mould of FIG. 1 at the point A-A.

A vacuum conduit 19 passes through the part 11A of the mould. Through the conduit 19 reduced atmospheric pressure may be applied to the component 17 to hold it in place against the surface 18. In FIG. 1 the vacuum conduit 19 terminates in a single opening 113 into the cavity 12, but in FIG. 2 the vacuum conduit 19 is subdivided into a large number of smaller conduits 114 which each terminate in small pinhole openings into the cavity 12.

Vacuum may be applied by an external pump and vacuum manifold system of conventional type (not shown).

The component 17 has holes 110 passing completely through it. Part 11B is formed with internal cores 111 which pass through these holes 110 and contact surface 18 of part 11A of the mould.

A melted first fluid plastics material (not shown) is injected via gate 112 into the cavity 12, and flows through cavity 12 to form the toothbrush handle in part 14, the head in part 15, the neck in part 16, and grip handle 14 of the toothbrush. The plastics material also flows to contact the shell component 17. Adhesion occurs between the shell 17 and the plastics material. Additionally or alternatively there may be further holes in the thin shell material 17, so that the plastics material can flow into such holes, and optionally through such holes, to thereby engage with the shell 17.

The outer surface of the shell 17, in contact with the cavity surface 18, forms the outer surface of the article formed in the cavity 12 in the injection process. The assembly of plastic and foil 17 is removed from the mould using conventional ejector pins (not shown) once the plastic material has cooled and hardened.

Figure 4:
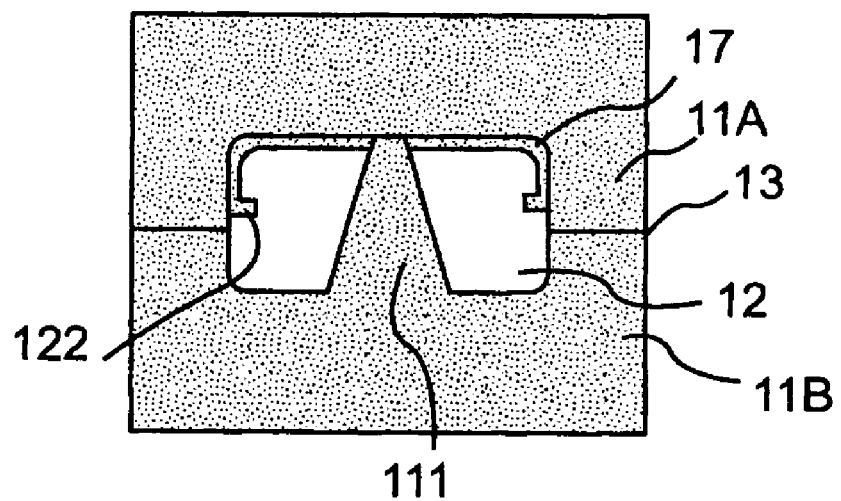
FIG. 4 shows another cross section through the mould of FIG. 1 at the point A-A.

FIG. 4 shows a shell 17 provided with anchors or barbs 122 at its edges which become embedded in the first plastic material and anchor the hardened plastics material and component 17 together. Anchors or barbs (not shown) may be provided at other parts of the shell 17.

FIG. 5 shows the longitudinal section through the product 31 (overall) of this first injection step described above using mould 11. It is seen that the shell 17 is fixed onto the grip handle part 14 by adhesion between shell 17 and the hard plastic material part of the product 31, and together the foil 17 and grip handle part 14 form a smooth continuous surface.

As shown in FIG. 1 the mould cavity in the part 11B is so shaped as to include a convexity 115 which forms a corresponding resulting hollow 116 in the grip handle part of the product 31. Around the cores 111 resulting apertures 117 through the hard plastic material part of product 31 have been left when the cores 111 are removed on separation of the parts 11A and 11B of the mould 11.

Referring to FIGS. 6 and 7 a process for making a two-material, e.g. hard plastic material and elastomeric, i.e. rubbery material, toothbrush 51 is illustrated.

Using known techniques of toothbrush manufacture the product 31 shown in FIG. 5 is introduced into a second injection mould 41, again in two half moulds 41A, 41B, with an injection port 42 for injection of a fluid rubbery material as shown in FIG. 6. The mould 41 parts at part line 43. Cavities 44 are provided in mould part 41A in communication with the holes 110 and apertures 117. The mould part 41B includes a cavity 118 in communication with apertures 117 and in communication with the hollow 116 in the product 31 when this is present in the mould 41.

In FIG. 7 the product 51 (overall) obtained by injecting fluid rubbery second material 119 into cavity 118 via port 42 is shown. The rubbery material 119 has thereby formed an elastomer grip pad on the handle of the product 51. The injected rubbery material 119 has also flowed through apertures 117 and holes 110 in the foil 17 to be exposed on the outer surface of the shell 17 to thereby provide decorative and or grip-enhancing features 120 of rubbery material. As shown in FIG. 7 the exposed second material bulges convexly from the surface of the shell 17, in shapes corresponding to cavities 44, as small grip enhancing buttons.

Each bulge 120 is generally hemispherical or generally conical, of diameter ca. 0.75-2.0 mm and projecting ca. 0.3-1.0 mm above the outer surface of the shell. Typically such a pattern of bulges may be arranged in a regular pattern with their centres ca. 0.3-1.0 cm, typically ca. 0.4-0.5 cm apart for optimal grip.

In the process of the invention the component 17 may be manipulated and introduced into the mould part 11A by automated techniques and conventional robotic technology. The automated operation of injection moulding machines is well known in the head of toothbrushes made of plastics and rubbery materials. Typically an injection moulding machine will include more than one such cavity as 12 and 118. In toothbrush injection moulding, injection moulding machines with up to 20 such cavities fed by a corresponding number of gates such as 112 and 42 or a manifold system are commonplace. The process of the invention is applicable to multiple cavity toothbrush injection moulding machines.

Although shown as two-part (11A, 11B and 41A, 41B) injection moulds, it will be seen that the head 121 of the toothbrush formed in part 15 of cavity 11 and the part of the toothbrush between the head 121 and the handle 14 (i.e. the "neck" region) formed in part 16 of cavity 11 are not involved in the second moulding stage in which the rubbery material 119 is injected in. Consequently the part of the mould 11 which encloses the head 121 and neck may be separated from the part of the mould 11 which encloses the handle 14.

What is claimed is:

1. A process for making a moulded article consisting partly of a hard first plastics material, comprising:
    providing a first injection mould having a cavity which defines at least part of the shape of the article to be formed and having a cavity surface bounding the cavity;
    introducing a component which comprises a thin shell, made of thin sheet-form metal, plastic or a metal-plastic laminate or composite, a surface of which forms at least part of the outer surface of the article into the cavity adjacent to the cavity surface;
    injecting a first fluid plastics material into the first mould cavity, under conditions such that the plastics material flows into contact with the component and when the plastics material solidifies the hardened plastic material is fixed to the component and the component forms at least part of the outer surface of the article;
    then further processing the article in a second moulding operation by providing a second injection mould part having a second mould cavity therein;
    introducing the article into the second mould cavity of the second injection mould part;
    injecting a melted fluid second material into the second mould cavity and into contact with the article; and
    allowing the melted fluid second material to solidify sufficiently and such that when the second material solidifies the hardened second material is fixed to the article.

2. A process according to claim 1 wherein the moulded article formed in the process is a part toothbrush comprising a grip handle part and a head part.

3. A process according to claim 1 wherein the component is held in place in the cavity in contact with the cavity surface by the application of reduced atmospheric pressure to the component via a conduit in the mould and opening into the first mould cavity, sucking the component against the cavity surface.

4. A process according to claim 1 wherein the second material is a rubbery material.

5. A process according to claim 1 wherein one or more hollow is provided in the article formed in the first moulding operation, suitable to receive, and be wholly or partially filled with, the second material in the second moulding step.

6. A process according to claim 1 wherein the article formed in the first injection moulding stage is formed with one or more aperture in its structure so that the second material may flow through the aperture and flow to parts of the article distanced from the injection gate of the second material.

7. A process according to claim 6 wherein the component has one or more hole therein, in communication with an aperture when the article is in the second mould, so that the second material can flow via the aperture and into and optionally through the hole to thereby form a part of the second material exposed on the outer surface of the component.

8. A process according to claim 7 wherein in the second mould there is a cavity adjacent a hole so that the exposed second material forms a convex bulge on the surface of the component.

* * * * *